(12) United States Patent
Linnell et al.

(10) Patent No.: US 10,059,052 B1
(45) Date of Patent: Aug. 28, 2018

(54) WET/DRY 3D PRINTING

(71) Applicant: X Development LLC, Mountain View, CA (US)

(72) Inventors: Jeff Linnell, Woodside, CA (US); Brandon Kruysman, San Francisco, CA (US); Jonathan Proto, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/717,286

(22) Filed: Sep. 27, 2017

Related U.S. Application Data

(63) Continuation of application No. 14/588,082, filed on Dec. 31, 2014, now Pat. No. 9,827,713.

(60) Provisional application No. 62/078,202, filed on Nov. 11, 2014.

(51) Int. Cl.
*B29C 64/386* (2017.01)
*B29K 105/00* (2006.01)
*B33Y 70/00* (2015.01)
*B33Y 30/00* (2015.01)
*B33Y 10/00* (2015.01)

(52) U.S. Cl.
CPC .... *B29C 64/386* (2017.08); *B29K 2105/0058* (2013.01); *B29K 2105/251* (2013.01); *B29K 2995/0005* (2013.01); *B33Y 10/00* (2014.12); *B33Y 30/00* (2014.12); *B33Y 70/00* (2014.12)

(58) Field of Classification Search
CPC .......................... B29C 64/386; B29C 64/393
See application file for complete search history.

(56) References Cited

U.S. PATENT DOCUMENTS

| | | | |
|---|---|---|---|
| 5,340,656 A | 8/1994 | Sachs et al. | |
| 2006/0022379 A1 | 2/2006 | Wicker et al. | |
| 2006/0290772 A1 | 12/2006 | Hwang et al. | |
| 2008/0211132 A1 | 9/2008 | Feenstra | |
| 2008/0241404 A1 | 10/2008 | Allaman et al. | |
| 2013/0292862 A1 | 11/2013 | Joyce | |
| 2014/0268604 A1 | 9/2014 | Wicker et al. | |

FOREIGN PATENT DOCUMENTS

WO    2013163585    10/2013

*Primary Examiner* — Timothy Kennedy
(74) *Attorney, Agent, or Firm* — Fish & Richardson P.C.

(57) ABSTRACT

A 3D printing process may form a 3D object by alternatingly forming layers from a liquid resin and a solid. For instance, when printing a 3D object, the 3D printer may at least partially cure a layer of liquid resin, and before the curing of the resin is complete, dip the semi-cured resin into a vat containing graphene powder so as to create a super strong 3D object. As another example, each semi-cured resin layer could be pressed into a vat of fiberglass such that the fiberglass is coupled to the semi-cured resin. The resin may then be allowed to finish curing before the next layer of resin is formed. In other embodiments, this process could be used to embed sensors in 3D printed objects.

20 Claims, 10 Drawing Sheets

WET/DRY 3D PRINTING

CROSS-REFERENCE TO RELATED APPLICATIONS

This application is a continuation of U.S. application Ser. No. 14/588,082, filed Dec. 13, 2014, which claims the benefit of U.S. Provisional Application Ser. No. 62/078,202 filed Nov. 11, 2014, the contents of which are hereby incorporated by reference.

BACKGROUND

Three-Dimensional ("3D") printing is an additive manufacturing process in which successive layers of material are laid down on top of each other to form a solid 3D object. Over time, various types of 3D printing process have been developed, including extrusion-based 3D printing (e.g., fused deposition modeling (FDM)), and processes based on light polymerization, such as stereolithography (SLA) and digital light processing (DLP), among others.

In stereolithography processes, a 3D structure is built up one layer at a time, with each layer being formed by exposing a photo-reactive resin to an ultraviolet (UV) light source that cures the resin. Note that stereolithography may also be referred to as optical fabrication, photo-solidification, and/or solid free-form fabrication and solid imaging.

More specifically, in a typical stereolithography process, a digital 3D model of an object is created by a user via the software interface of a 3D printing application. The 3D printing application then slices the 3D model with a set of horizontal planes. Each slice of the 3D model can then be converted to a two-dimensional mask image, such that the 3D model is represented as a sequence of two-dimensional mask images, each of which outline the shape of the corresponding layer from the 3D model. The mask images are sequentially projected onto a photo-curable resin surface so as to cure the resin in the shape of the layer. Alternatively, instead of using masks, each slice of the 3D model may be representing by a two-dimensional image in the shape of the slice, so that a projector can project a sequence of such two-dimensional images onto the resin surface to form an object corresponding to the digital 3D model.

SUMMARY

Example embodiments relate to three-dimensional (3D) printing systems and methods. A 3D printer may form a 3D object by combining photo-curable resin and a solid aggregate material. For example, a 3D object may include multiple layers that include the solid aggregate material embedded in a resin matrix. Solid aggregate materials may include fiberglass, carbon nanotubes, carbon fiber, rubber dust, or other materials. The 3D printer may partially cure photo-curable resin coupled to a base plate. Thereafter, the 3D printer may cause the base plate to push against the solid aggregate material so as to cause the solid to impinge at least partially into the partially-cured photo-curable resin. Accordingly, solid material may adhere or may become physically coupled to the resin. Thereafter, the photo-curable resin may be fully cured so as to further mechanically couple the solid aggregate material to the resin matrix. Example embodiments may help realize 3D-printed materials and objects which have improved strength, flexibility, and/or other characteristics. For instance, the layer-by-layer 3D printing process disclosed herein may enable objects formed from a cross-hatched fiberglass weave.

In a first aspect, a system is provided. The system includes a base plate, a plurality of containers, one or more light sources, and a control system. The plurality of containers includes at least a first container and a second container. The first container includes a photo-curable resin. The second container includes a solid aggregate material. At least one of the base plate and the plurality of containers are moveable with respect to the other. The one or more light sources are configured to emit radiation operable to cure the photo-curable resin. The control system is configured to form a three-dimensional structure by carrying out instructions. The instructions include causing a first layer of the three-dimensional structure to be formed by partially curing a layer of the photo-curable resin in the first container. The first layer is coupled to the baseplate. The instructions further include, after partially curing the photo-curable resin, moving at least one of the base plate and the second container so as to couple the partially-cured photo-curable resin and the solid aggregate material. The instructions further include causing the one or more light sources to further cure the photo-curable resin.

In a second aspect, a method is provided. The method includes providing a plurality of containers configured to move with respect to a base plate. The base plate is configured to support a three-dimensional structure. The plurality of containers includes at least a first container and a second container. The first container includes a photo-curable resin and the second container includes a solid aggregate material. The method further includes coordinating movement of the plurality of containers to form the three-dimensional structure. The three-dimensional structure includes a plurality of layers of the photo-curable resin and the solid aggregate material. The method additionally includes causing a first layer of the three-dimensional structure to be formed from photo-curable resin in the first container. The method yet further includes after formation of the first layer, causing one or more light sources to at least partially cure the photo-curable resin. The method also includes after partially curing the photo-curable resin, causing a layer of the three-dimensional structure to be formed from the solid aggregate material in the second container. The solid aggregate material impinges at least partially into the first layer. The method further includes after formation of the second layer, causing one or more light sources to further cure the photo-curable resin.

In a third aspect, a method is provided. The method includes receiving a material property preference related to fabrication of a three-dimensional structure. The material property preference includes at least a durometer preference. The method also includes determining a first container and a second container from a plurality of movable containers based on the material property preference. The first container includes a photo-curable liquid and the second container includes a solid aggregate material. The method also includes causing the first container to move proximal with respect to a baseplate. The baseplate is configured to support the three-dimensional structure. The method yet further includes causing a first layer of the three-dimensional structure to be formed from the photo-curable liquid in the first container. The method additionally includes causing one or more light sources to at least partially cure the photo-curable liquid. The method also includes causing the second container to move proximal with respect to the baseplate and causing a second layer of the three-dimensional structure to be formed from the solid aggregate material in the second container. The solid aggregate material impinges at least partially into the first layer. The method yet further includes after formation of the second layer, causing the one or more light sources to further cure the photo-curable liquid.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
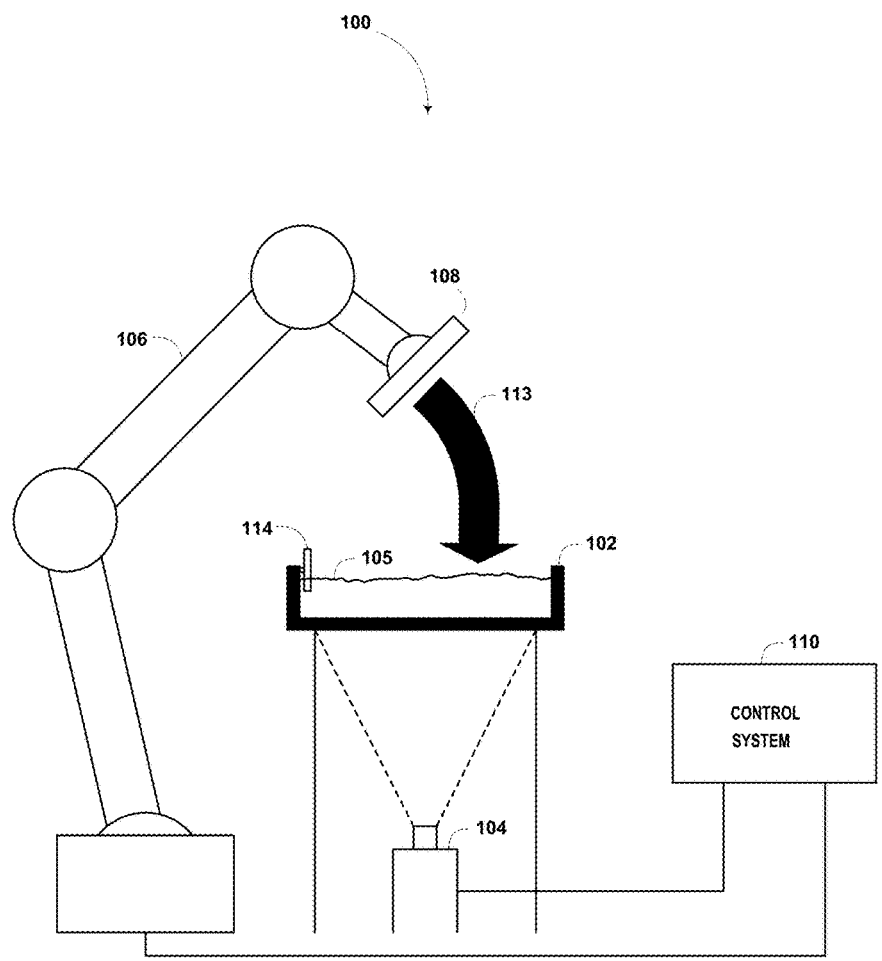
FIG. 1A shows a three-dimensional printer system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A 3D printing process may form a 3D object by alternatingly forming layers from a liquid resin and a solid. For instance, when printing a 3D object, the 3D printer may at least partially cure a layer of liquid resin, and before the curing of the resin is complete, dip the semi-cured resin into a vat containing graphene powder so as to create a super strong 3D object. As another example, each semi-cured resin layer could be pressed into a vat of fiberglass, such that the fiberglass threads are pushed into the semi-cured resin.

The resin may then be allowed to finish curing before the next layer of resin is formed. In other embodiments, this process could be used to embed sensors in 3D printed objects. In a further aspect, such a wet/dry printing process may be implemented by a 3D printer that uses a robotic arm with a base plate attached thereto in order to move the in-progress object between the two vats during the printing process. Alternatively, such a wet/dry printing process may be implemented by a 3D printer that uses a rotating multi-vat system to move different vats into a printing area underneath the base plate.

In one embodiment, the vats are in a rotating system: A 3D printer may include a base plate that is positioned above a printing area, and a rotating multi-vat system underneath the base plate. For example, two, three, four, or more vats may be arranged around a circular disk. The circular disk may be rotated to move different vats into the printing area underneath the base plate. Further, the different vats may include different materials. For instance, the different vats could include different types of liquid resins, metals, dyes, etc. Thus, the disk could be rotated to provide a 3D printing process in which multiple types of materials are used to print a 3D object.

II. 3D Printer System Examples 3D printers contemplated herein may take various forms. Some examples of such 3D printers are described below. However, it should be understood that the example 3D printers described herein are not intended to be limiting, and that other types of 3D printers and variations on the 3D printers described herein are also possible.

In some embodiments, a 3D printer system may include a robotic arm or another robotic device that suspends a base plate above a photo-reactive resin or another container. The robotic arm initially submerges the base plate in the resin while a projector below the resin projects an image from a light source towards the photo-reactive resin to at least partially cure the first layer on the base plate. The robotic arm may then move the base plate with respect to another container containing a solid aggregate material. The robotic arm may push the base plate into the solid aggregate material so as to cause the solid aggregate material to impinge the first layer. Thereafter, the first layer may be further cured, for example with further illumination from the light source. This process may be then repeated as the object is built up layer by layer.

The solid aggregate material may include a variety of materials in solid form. Specifically, the solid aggregate material may include bulk materials that have been etched, crushed, cut, pulverized, or otherwise made into smaller components. Additionally or alternatively, the solid aggregate material may include elemental materials or building-blocks that have been assembled, mixed, grouped, incorporated, or otherwise made into larger components. Generally, individual components of the solid aggregate material may range in dimension from dust (less than 100 microns in diameter) to larger, macro components (over 1 mm in diameter). Other sizes of the individual components are possible.

Further, in some embodiments, the robotic arm may be configured to move the base plate, and thus the object being printed thereon, with two or more degrees of freedom. This, in turn, may allow for the creation of layers that are "wedge-shaped," or in other words, that have opposing surfaces in non-parallel planes. Accordingly, some or all layers may be non-parallel to an adjacent layer. Configured as such, an example 3D printing system may allow for the creation of objects that are much larger than those that can be created in a 3D printer where the build volume is constrained, e.g., by the dimensions the resin container and/or the solid aggregate containers.

The ability to vary the angle of layers in a 3D-printed object may allow for flexibility in structural design and/or greater control of the structural characteristics of 3D-printed objects. For instance, by changing the orientation of layers within a 3-D printed object, it may be possible to intelligently control characteristics of the object such as structural rigidity, elasticity, durometer, etc.

Additionally or alternatively, a 3D printer system with a base plate mounted to a robotic arm may allow for creation of objects with less temporary support structures than might otherwise be needed during the 3D printing process. For example, 3D printing of an object such as an arch (or another object with an overhang) might otherwise require that support structures be created beneath the arch, in order to support the arch during the printing process. When such support structures need to be removed after 3D printing an object, this can add time and/or manual labor to the process, and can result in imperfections at locations where supports are removed. However, in some embodiments, the base plate suspends an in-progress object from above during the printing process, which in some cases may remove the need to create support structures below the object.

FIG. 1A shows a three-dimensional printer system 100, according to an example embodiment. The 3D printer system 100 includes a resin container 102, as well as a light source 104 arranged below the resin container. The light source 104 is operable to emit electromagnetic radiation towards the resin container in a controlled manner, such that the electromagnetic radiation cures the resin 105 in the resin container 102. The light source 104 may be an element of a stereolithography device as described above. Alternatively or additionally, the light source 104 may include a digital light processing (DLP) device. Further, 3D printer system 100 includes a robotic arm 106 having the base plate 108 attached thereto.

The robotic arm 106 is operable to position the base plate 108 above the resin container 102, and to move the base plate 108 with respect to the resin container 102 with at least two degrees of freedom (and more specifically, in the illustrated example, with three degrees of freedom). As a result, the build volume of the 3D printer system 100 extends beyond the edges of the resin container.

In an example embodiment, the robotic arm 106 may be an articulated robot with three rotary joints, allowing the robotic arm 106 three degrees of freedom. However, more or less rotary joints are possible. Further, note that that a 3D printer system can mount a base plate to various types of robotic devices, and is not limited to robotic arms. For example, the base plate could be mounted to a two-axis head unit or a robotic arm having four degrees of freedom. Additionally, while a robotic arm with rotary joints is described herein, other types of joints are possible, for example, ball joints, pivot joints, or hinge joints. Other examples are also possible.

The base plate 108 may be implemented as an end effector on robotic arm 106. Further, robotic arm 106 may be programmable, such that a set of control instructions can be generated to moves the robotic arm 106 in a manner that results in creation of a particular object on base plate 108. In particular, the robotic arm 106 may be configured to move the base plate 108 along a path 113 that may bring the base plate 108 into contact with various materials, such as the resin 105 and solid aggregate materials as described below.

A base plate 108 may vary in size and/or shape, depending upon the particular embodiment. Further, the base plate 108 may be formed from various materials or combinations of materials, depending upon the particular embodiment. Generally, the surface of the base plate 108 may be formed from any material to which a base layer of resin will adhere when cured. Further, since the base plate holds the object being printed from above, the size, the weight distribution, the shape, and/or the adhesive properties of the base plate's surface that faces the resin container, may be designed so as to provide support for certain loads (e.g., so that the base plate can hold objects up to a certain weight, shape, and/or size).

The resin container 102 may be of various sizes and/or shapes, depending upon the particular embodiment. Further, the bottom of the resin container 102 may be formed from any material that allows for transmission of electromagnetic waves from the appropriate region of the electromagnetic spectrum for curing the resin 105, such that the appropriate electromagnetic waves emitted by projector 104 can pass through the bottom of the resin container 102 to at least partially cure the resin 105. For example, if resin 105 is an ultraviolet-curable photopolymer, then the bottom of resin container 102 may be formed from any material that ultraviolet waves can pass through. Other examples are possible.

Further, note that example embodiments are not limited to the stereolithography techniques described herein. In some embodiments, a laser could be used to cure the resin instead of a UV light source. Further, various types of resins may be utilized, including liquid and powdered photo-curable resins, without departing from the scope of the invention. Other variations on the embodiments described herein are also possible.

The projector 104 may take various forms, depending upon the particular implementation. In general, the projector may be any controllable light source that emits electromagnetic waves from the appropriate region of the electromagnetic spectrum for curing the resin 105. In some embodiments, the projector 104 may be controllable to emit electromagnetic radiation (e.g., UV light) that is shaped according to a particular slice of a 3D model, such that the resin 105 cures to form a layer of the 3D object having the same shape. In some embodiments, the projector could be a standard consumer projector having its UV filter removed. Other types of projectors are also possible.

In a further aspect, it may be desirable to agitate the surface of the resin 105 during the 3D printing process. Specifically, agitating the surface of the resin may improve the 3D printing process by, e.g., improving the uniformity of the layers in the printed object. Thus, in some embodiments, such as that shown in FIG. 1A, a scraper 114 may be implemented in resin container 102. The scraper 114 may be operable to move across the resin container 102, in order to agitate the surface of the liquid resin 105.

For example, the scraper 114 may be operated to periodically agitate or "scrape" the surface of resin 105 during the process of 3D printing an object, such as after the formation of each layer, or according to some predetermined interval. In some implementations, the scraper 114 may be operated manually by a human. Additionally or alternatively, the scraper 114 may be automated (e.g., motorized), such that a control system 110 can automatically operate the scraper during the 3D process. For example, a control system 110 may automatically move the scraper across the resin container 102 after the curing of each layer is completed.

As an additional or alternative way to control a top surface of the resin 105 or other materials housed in the container, the container may be vibrated, rotated, or otherwise moved to form a desirable top surface flatness, surface height, texture, or pattern.

The build volume of an example system, such as 3D printer system 100, may be defined at least in part by the range of movement and/or the reach of the robotic device to which the base plate is mounted. For example, in FIG. 1A, the build volume may be defined by the range of movement of the robotic arm 106. Other examples are possible.

Further, example embodiments, such as the 3D printer system 100, may allow for the creation of objects that are much larger than those that can be created in a 3D printer where the build volume is defined by the dimensions the pan (e.g., the surface area of resin container 102) and/or by the surface area of the base plate.

By changing the orientation of layers within a 3D printed object, it may be possible to intelligently control characteristics of the object such as structural rigidity, elasticity, etc. Accordingly, a 3D printer system 100 may allow for more flexibility in specifying the structural characteristics of an object being printed. For example, a 3D printer system 100 may be used to create a more stable structure (e.g., a structure that can manage higher compression loads). Other examples are also possible.

3D printer system 100 may also include or be communicatively coupled to a control system 110. A control system 110 may take the form of or include executable program logic, which may be provided as part of or in conjunction with the 3D printer system 100. Such program logic may be executable to, e.g., generate control signals for the 3D printer system 100. For example, a number of program-logic modules may be included as part of a control system, such as control system 110.

In an example embodiment, control system 110 may be operable to: (a) receive data including a three-dimensional model of an object or structure and optionally a material property preference, (b) based at least in part on the 3D model, generate control signals that coordinate movement of the base plate 108 (via control of the robotic device 106) and/or the plurality of containers, and (c) control the operation of the light source 104 to form the object specified by the 3D model in a layer-by-layer manner.

Other types of 3D printers are also possible. For example, a 3D printer may be configured for stereolithography using a base plate that is only movable upwards and downwards (i.e., with one degree of freedom). In other embodiments, a 3D printer may be configured for stereolithography using a base plate that is moveable with two degrees of freedom; e.g., vertically movable (i.e., upwards and downwards) and horizontally moveable (e.g., parallel to the surface of the resin in the resin container). Other examples and configurations of 3D printers are also possible.

Figure 1B:
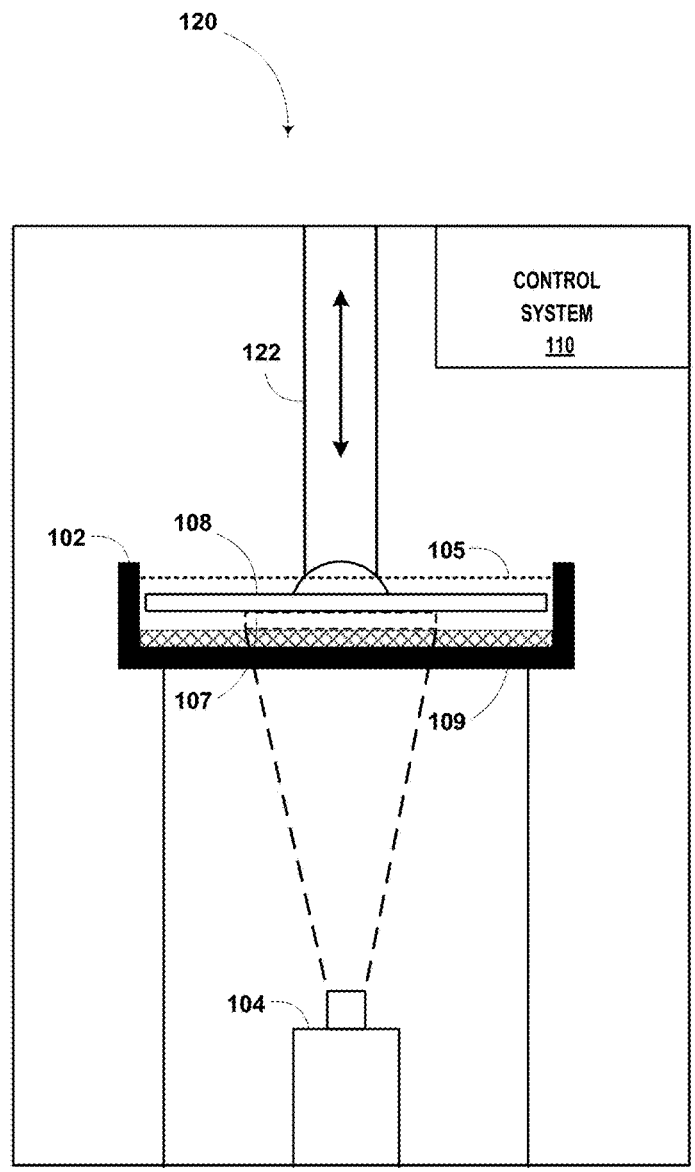
FIG. 1B shows a three-dimensional printer system, according to an example embodiment.

FIG. 1B shows another 3D printer system 120, according to an example embodiment. 3D printer 120 includes a base plate mechanism 122 that is operable to move the base plate 108 upwards and downwards (i.e., with one degree of freedom). Note that base plate 108, resin 105, resin container 102, light source 104, and/or control system 110 shown in FIG. 1B may be the same as or different from the like-numbered aspects shown in FIG. 1A. Further, note that the control system 110 in 3D printer 120, and control systems for other 3D printers, may generally include some form of non-transitory computer readable medium (e.g., some form of memory or data storage), with program instructions that are executable to carry out a 3D printing process.

3D printer 120 also includes a substrate 109 on the bottom of the resin container. The substrate 109 may be formed from material that allows UV radiation from the light source 104 to pass through to the liquid resin 105. For example, substrate 109 may be formed from a layer of clear or semi-transparent material such as Polydimethylsiloxane (PDMS).

To print each layer of an object, the base plate 108 may be positioned in the liquid resin 105, above the substrate 109. More specifically, the base plate 108 may be positioned such that the distance between the bottom of the base plate 108 and the top of substrate is substantially equal to the desired height of the layer being cured. In this context, "substantially equal" should be understood to mean that the separation is such that a layer of a desired height can be formed when the liquid resin between the base plate and substrate is cured; e.g., a separate that is equal or perhaps slightly greater than the desired height of the layer being cured (1 mm or slightly greater than 1 mm, if a layer of 1 mm is desired, for instance). A layer 107 of the 3D object may then be formed by exposing the liquid resin that is between base plate 108 and substrate 109 to UV radiation from light source 104.

In some embodiments, substrate 109 may be formed from Teflon or other similar materials, such as Polymethylpentene film, instead of from PDMS. Teflon has similar adhesive characteristics as PDMS; e.g., cured resin does not significantly adhere to either material, which thus allows for cured resin to be easily removed from the substrate once a layer is complete. However, Teflon tends to dissipate heat more efficiently than PDMS. As a result, the internal temperature of PDMS substrate may increase more during the course of a 3D printing process, than the internal temperature of Teflon substrate does during a comparable 3D printing process. When the temperature of PDMS substrate increases, it may become more difficult to remove cured resin from the PDMS substrate. Therefore, Teflon may allow for cleaner separation of a cured resin layer from the substrate. However, other materials are contemplated within the context of this disclosure.

Figure 1C:
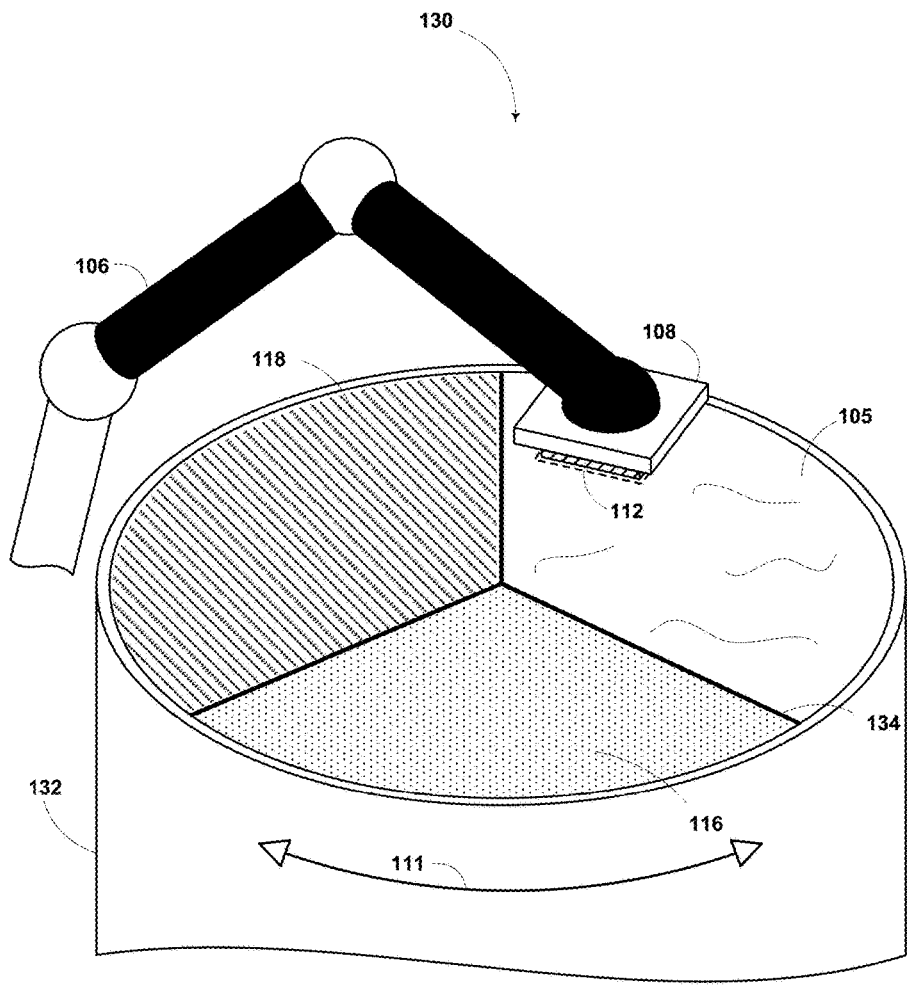
FIG. 1C shows a robotic arm in relation to a plurality of containers during the process of three-dimensional printing an object, according to an example embodiment.

FIG. 1C illustrates a scenario 130 that depicts a robotic arm in relation to a plurality of containers during the process of three-dimensional printing an object, according to an example embodiment. Note that resin 105, robotic arm 106, and base plate 108 shown in FIG. 1C may be the same as or different from the like-numbered aspects shown in FIG. 1A. As shown in scenario 130, vat 132 may include partitions 134. The partitions 134 may form a plurality of containers in the vat 132. For example, the vat 132 may include multiple materials, each within its own container. The materials may include resin 105, a first solid aggregate material 116, and a second solid aggregate material 118. In some embodiments, the vat 132 may include more or less containers. As shown in scenario 130, the robotic arm 106 may be operable position the base plate 108 so as to be in contact with the resin 105. The robotic arm 106 may be further operable to position the base plate 108 in order to make contact with the first solid aggregate material 116 and/or the second solid aggregate material 118.

Alternatively or additionally, the vat 132 may be operable to rotate or otherwise move with respect to the base plate 108. For example, the vat 132 may move in a rotational path 111 so as to position the materials in the containers proximate to the base plate 108. The vat 132, or portions of the vat 132, may additionally be operable to move the materials in the containers upwards or downwards with respect to the base plate 108. Other ways to bring the materials in the containers in contact with the base plate 108 are contemplated herein.

Using a process similar or identical to that described above in reference to FIG. 1B, a first layer 112 may be formed. Specifically, by putting the base plate 108 in contact with the resin 105 and exposing the resin 105 to appropriate illumination, the first layer 112 may form on, or be otherwise coupled to, the base plate 108. The first layer 112 may include partially-cured resin. As partially-cured resin, the first layer 112 may be tacky, sticky or glue-like.

Thus, the partially-cured resin may present a surface to which the solid aggregate material may adhere. Alternatively, the partially-cured resin may physically attract the solid aggregate material via Van Der Waals forces or static attraction. Other ways of physically coupling the solid aggregate material to the partially-cured resin are possible.

After partially curing the resin to form the first layer 112, at least one of the base plate 108 and another container may be moved so as to push the first layer 112 against a solid aggregate material. For example, once the first layer 112 is formed, the robotic arm 106 may move the base plate 108 out of the resin 105. The vat 132 may then rotate so as to position the base plate 108 and the first layer 112 over the first solid aggregate material 116. The robotic arm 106 may move the base plate 108 so as to push the first layer 112 against the first solid aggregate material 116. By causing physical contact between the first layer 112 and the first solid aggregate material 116, some of the first solid aggregate material 116 may impinge into the first layer 112 or may otherwise become coupled to the first layer 112.

After the first solid aggregate material 116 is coupled to the first layer 112, the partially-cured resin of the first layer 112 may be further cured (for instance by further illumination from a light source) so as to harden, solidify, or otherwise change the chemical and/or physical structure of the first layer 112.

In this fashion, a 3D object may be formed in a layer-by-layer manner. For example, after further curing the first layer 112, the robotic arm 106 and vat 132 may move so as to contact the resin 105. In such a scenario, a new layer may be formed by partially-curing the resin. For example, the resin proximate to the first layer 112 may be illuminated by a light source. Such partial-curing may cause resin to couple to the first layer 112.

The new layer may then be moved in relation to a solid aggregate material so as to physically couple the partially-cured photo-curable resin and the solid aggregate material. For example, the robotic arm 106 and the vat 132 may rotate so as to contact the second solid aggregate material 118. Such contact may cause the second solid aggregate material 118 to at least partially impinge on the new layer of partially-cured resin. Thereafter, the new layer may be illuminated to further cure the photo-curable resin. The formation of 3D objects using a plurality of layers is contemplated herein.

The 3D printing system may include containers that contain other materials related to the formation of 3D objects. For example, the system may include a container with an etchant. The etchant may be used to dissolve portions of the 3D structure, particularly those portions including uncured or partially-cured photo-curable resin. The system may additionally include containers that may include developer and other chemicals.

The solid aggregate material may include a variety of materials in homogeneous or heterogeneous combinations within the containers. Specifically, the solid aggregate material may include graphene powder, iron particles, carbon fiber, carbon nanotubes, fiberglass, metal, pebbles, ball bearings, and sensors.

The sensors may include radio frequency identification (RFID) tags that may be incorporated into the 3D object. By incorporating a plurality of RFID tags, a spatial "fingerprint" may be obtained for each 3D object. For example, a grid of RFID tags may be placed in several layers within a 3D object. By doing so, the object may have a 3D coordinate system to act as a reference, for instance, while moving the object. Furthermore, software may map sensors in the 3D object while or after the RFID tags are incorporated into the object. Other ways of using RFID tags are possible.

Further, the 3D printing system may include other materials that may be useful to create 3D objects. For example, at least one of the plurality of containers may include an electrode paste. The electrode paste may be used, for example, in the formation of a 3D-printed battery. Other materials are possible.

In association with the containers including solid aggregate materials, the control system 110 may be operable to maintain, modify, or otherwise control the surface and height characteristics of the solid aggregate materials. For example, the control system 110 may cause wipers to physically flatten or modify the surface of the solid aggregate material. Alternatively or additionally, the control system 110 may vibrate or spin the container so as to flatten or modify the surface of the solid aggregate material. In an embodiment, the solid aggregate material may be pushed up so as to maintain a constant vertical position with respect to a vertical reference point. In another embodiment, an entire container of solid aggregate material may be moved upward to maintain the constant vertical position. A constant vertical position (or top surface height) may be important to control the interaction between the solid aggregate material and the partially-cured resin.

A single 3D object may include one or more solid aggregate materials in order to satisfy a material property preference. For example, a user may input the material property preference into the user interface associated with control system 110. The material property preference may include durometer, hardness, opacity, conductivity, stiffness, flexibility, among other material characteristics. The control system 110 may be configured to determine between various solid aggregate materials in an effort to satisfy the material property preference. For example, if a user requests a very stiff 3D object, the control system 110 may determine that a combination of materials that includes fiberglass may be appropriate and carry out operations to form the 3D object. In a further example, if a user requests a very flexible 3D object, the control system 110 may determine that rubber dust should be incorporated into the 3D object as a solid aggregate material.

In yet another example, a user may request a highly conductive 3D object. In such a scenario, the control system 110 may determine that iron particles and/or carbon nanotubes may be the most suitable solid aggregate materials to use in the creation of the 3D object. Alternatively, a user may request some or all of the 3D object be highly insulating (or semiconducting). Adding solid aggregate materials such as non-conducting rubber, rock, or fiberglass may be used to make an insulating 3D object. Other examples will be evident to those with skill in the art.

Figure 1D:
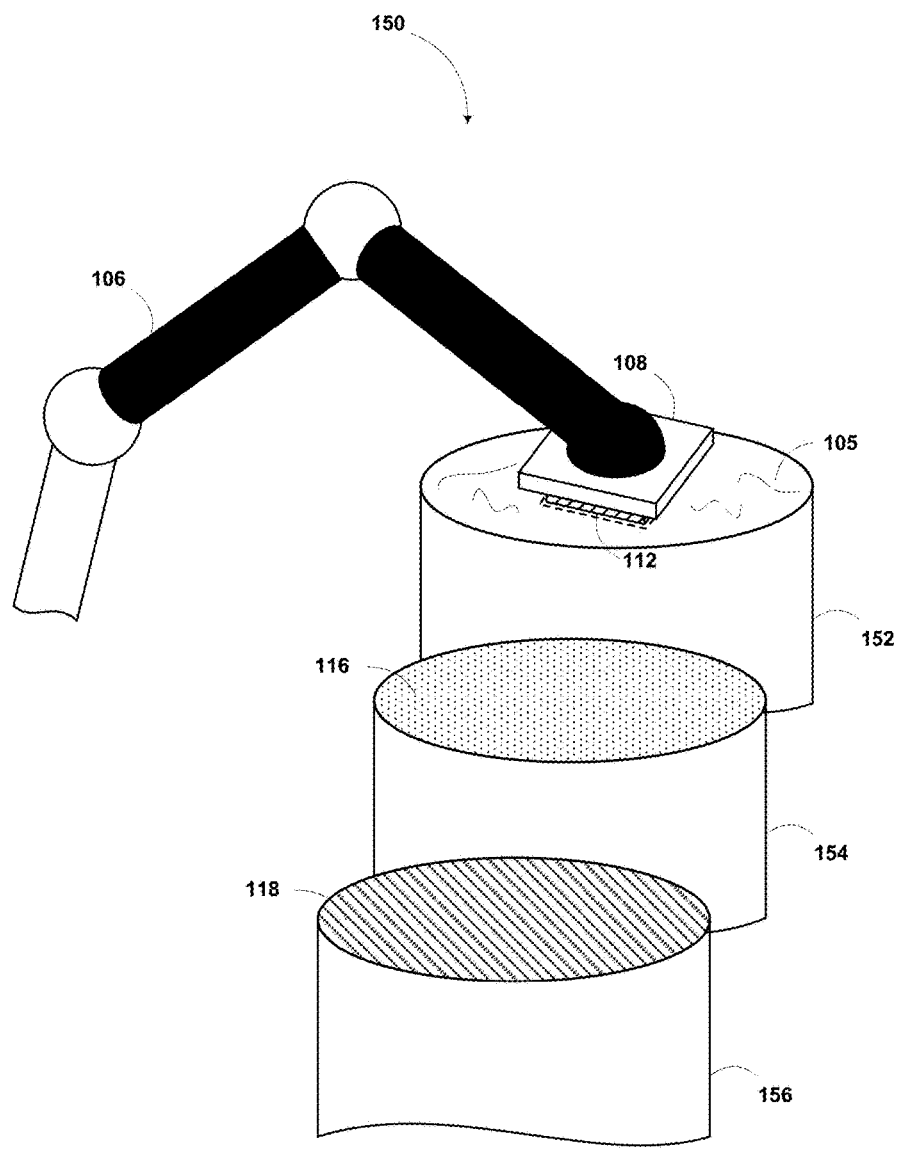
FIG. 1D shows a robotic arm in relation to a plurality of containers during the process of three-dimensional printing an object, according to an example embodiment.
Figure 1E:
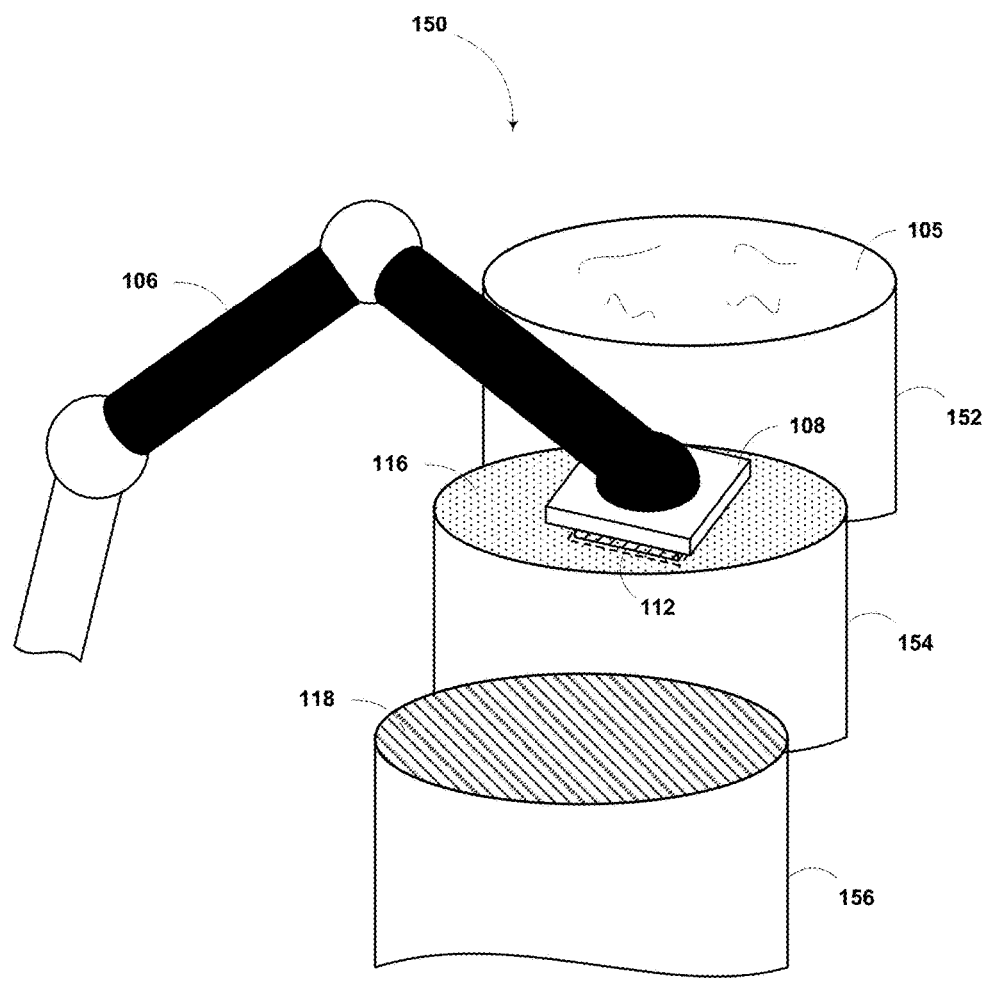
FIG. 1E shows a robotic arm in relation to a plurality of containers during the process of three-dimensional printing an object, according to an example embodiment.
Figure 1F:
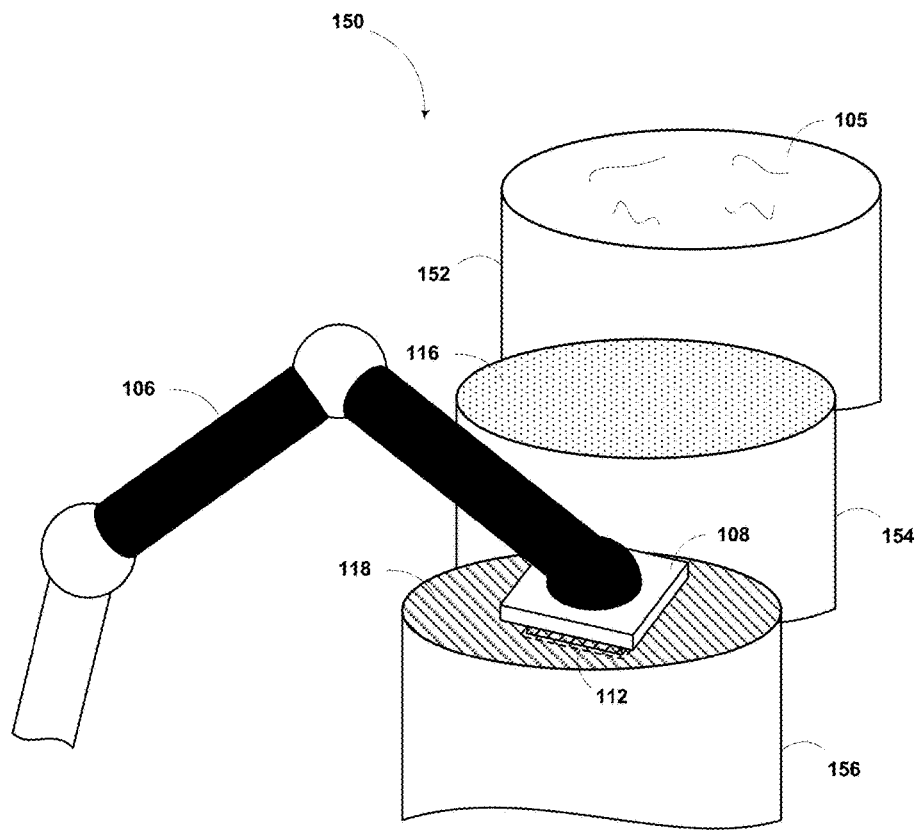
FIG. 1F shows a robotic arm in relation to a plurality of containers during the process of three-dimensional printing an object, according to an example embodiment.

FIGS. 1D-F illustrate a scenario 150 that depicts a robotic arm 106 in relation to a plurality of containers during the process of 3D printing an object, according to an example embodiment. Scenario 150 includes a resin container 152 containing resin 105, a first solid aggregate material container 154 containing the first solid aggregate material 116, and a second solid aggregate material container 156 containing the second solid aggregate material 118. The FIGS. 1D-F illustrate the base plate 108 in contact with each of three containers. Similar to the process described elsewhere herein, a plurality of layers may be formed by repeatedly contacting partially-cured photo-curable resin with solid aggregate materials and then further curing the resin.

FIGS. 1D-F illustrate the plurality of containers being in a linear grouping. As such, the containers may move along a linear track system. However, other physical arrangements of the plurality of containers are contemplated.

Figure 1G:
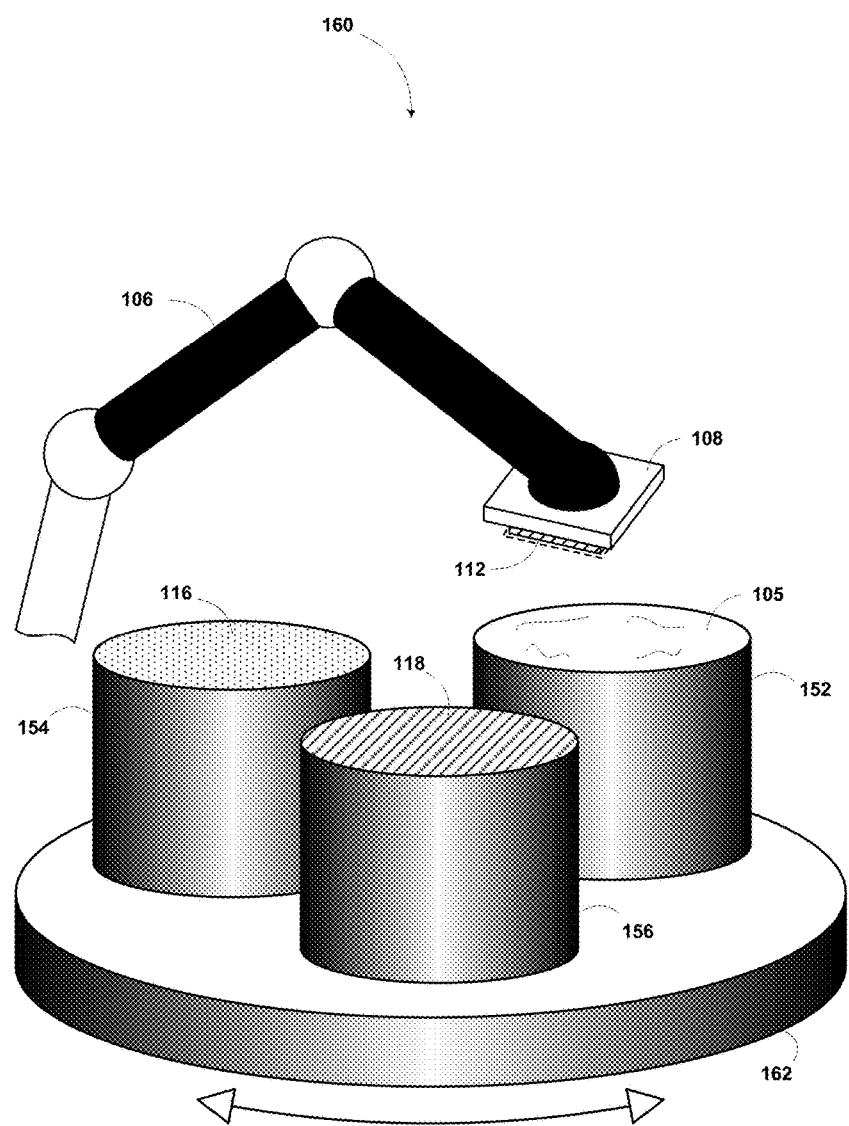
FIG. 1G shows a robotic arm in relation to a plurality of containers during the process of three-dimensional printing an object, according to an example embodiment.

FIG. 1G illustrate a scenario 160 that depicts a robotic arm 106 in relation to a plurality of containers during the process of 3D printing an object, according to an example embodiment. In such a scenario, the plurality of containers may be positioned on a rotary platform 162. The rotary platform 162 may be configured to support the containers and rotate or otherwise move so as to position the various materials in the containers proximate to the base plate 108.

Figure 2:
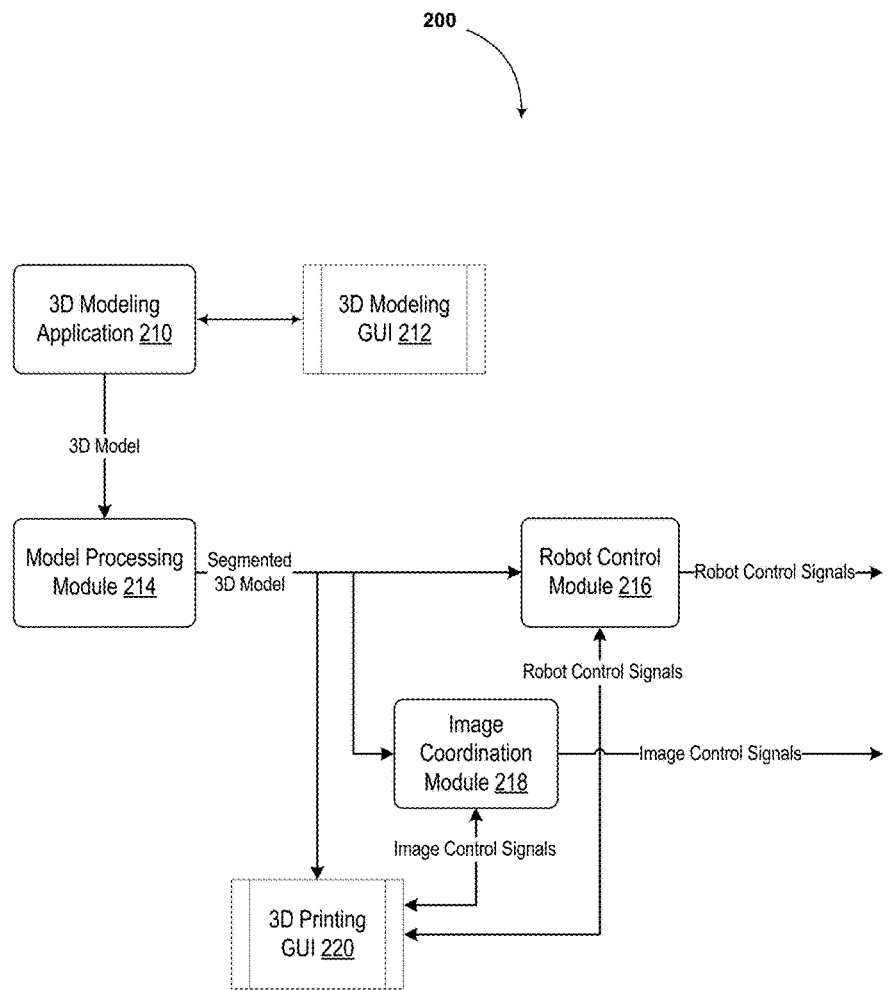
FIG. 2 shows example program logic modules for interfacing with and controlling a three-dimensional printer system.

FIG. 2 shows example program logic modules for interfacing with and controlling a 3D printer system. In particular, a 3D-modeling application 210 and corresponding graphical user interface 212 may allow for 3D model generation. Further, to prepare the 3D model for printing, a model-processing module 214 may apply a slicing process to the 3D model. For example, various techniques may be used to define an isosurface mesh for a 3D model, which may then be sliced into layers. Other examples are also possible.

The slicing process may slice the 3D model into segments, which each correspond to a layer, such that the object portrayed by the 3D model can be generated layer by layer from the segments of the 3D model. In addition, the 3D model may be sliced along non-parallel planes, such that some or all of the segments have opposing surfaces that are non-parallel.

The segmented 3D model may then be passed to both: (i) a robot-control module 216, which may generate robot control signals, and (ii) an image coordination module 218, which may generate image control signals signal for 3D printing, including image files and light-source control signals, in order to print a 3D object based on the 3D model. Further, note that the robot control module 216, the image coordination module 218, and/or other program logic modules may coordinate the timing of the robot control signals with the timing of the image control signals, so that the 3D printing process is properly carried out. In some embodiments, a 3D printing graphical user interface 220 may be operable to provide users a way to visualize, edit, control, monitor, and/or otherwise interact with the 3D printing process.

III. Method Examples

Figure 3:
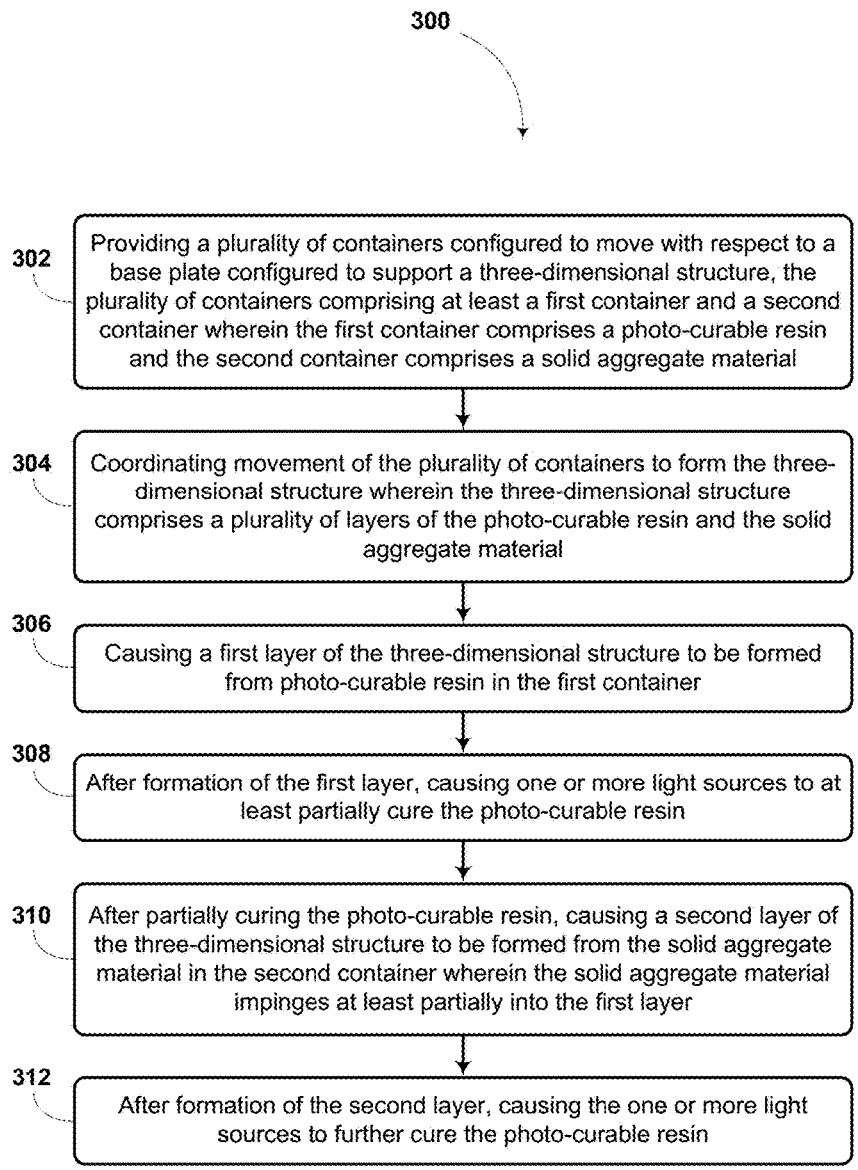
FIG. 3 is a flow chart illustrating a three-dimensional printing method, according to an example embodiment.

FIG. 3 is a flow chart illustrating a 3D printing method 300, according to an example embodiment. The method 300 includes blocks that may be carried out in any order. Furthermore, various blocks may be added to or subtracted from method 300 within the intended scope of this disclosure. The method 300 may correspond to steps that may be carried out using system 100, system 200, or another system illustrated and described in reference to FIGS. 1A-G and FIG. 2.

Block 302 includes providing a plurality of containers configured to move with respect to a base plate configured to support a three-dimensional structure. The plurality of containers includes at least a first container and a second container. The first container includes a photo-curable resin and the second container includes a solid aggregate material.

Block 304 includes coordinating movement of the plurality of containers to form the three-dimensional structure. The three-dimensional structure includes a plurality of layers of the photo-curable resin and the solid aggregate material.

As described above, the plurality of containers may be supported by a rotary platform. Further, a control system, such as control system 110, may be operable to control the position of the respective containers and/or the base plate. Specifically, the control system 110 may be operable to cause the base plate to come into contact with the photo-curable resin and the solid aggregate material.

Block 306 includes causing a first layer of the three-dimensional structure to be formed from photo-curable resin in the first container. For example, the control system may position the base plate of the 3D printer such that the bottom surface of the base plate is submerged in the liquid resin in the resin container. In particular, the base plate may be positioned in the liquid resin, just above a substrate at the bottom of the resin container. For example, the base plate may be positioned such that the distance between the bottom of the base plate and the printing interface (e.g., the top of a substrate in the resin container) is substantially equal to the desired height of the layer being cured, such as described in reference to FIG. 1B above.

Block 308 includes after formation of the first layer, causing one or more light sources to at least partially cure the photo-curable resin. As described above, the one or more light sources may include a UV light source. Furthermore, partially-curing the photo-curable resin may result in a sticky, tacky, or otherwise glue-like surface of the first layer.

Block 310 includes after partially curing the photo-curable resin, causing a second layer of the three-dimensional structure to be formed from the solid aggregate material in the second container wherein the solid aggregate material impinges at least partially into the first layer. Upon contact, the solid aggregate material may be incorporated into the first layer due to partial intrusion into the first layer and/or surface tension bonding. Alternatively or additionally, van der Waals or static forces may cause the solid aggregate material to be attracted to the first layer.

Block 312 includes after formation of the second layer, causing the one or more light sources to further cure the photo-curable resin. In an example embodiment, the base plate may be exposed using a different light source so as to further cure the photo-curable resin. Alternatively, the base plate may be illuminated using the same light source as in block 308.

Method 300 may optionally include a third container including a liquid operable to dissolve portions of the three-dimensional structure including uncured photo-curable resin. Method 300 may further include the plurality of containers being supported by a rotary platform. The control system may be further configured to cause the rotary platform to rotate so as to form respective layers of the three-dimensional structure.

As described above, the solid aggregate material may include graphene powder, carbon fiber, rubber dust, carbon nanotubes, fiberglass, metal, pebbles, ball bearings, and/or at least one sensor, such as an RFID tag. Solid aggregate materials contemplated herein may take different sizes and shapes. For example, pebbles and ball bearings may be several millimeters in diameter. Fiberglass fibers may be a few millimeters long and ten microns in diameter. Carbon nanotubes may be a few microns long and 10-100 nanometers in diameter. RFID tags may be a few square millimeters by 50 microns. Other sizes are possible.

In some embodiments, multiple different sizes or types of solid aggregate materials may be mixed within a particular container. In other embodiments, only one specific material type, size, and/or orientation may be present in a particular container.

While building up a 3D-printed object, it may be desirable to maintain the top surface of the solid aggregate material within its container in the same location and/or vertical level, and maintaining flatness. In other words, as the 3D-printed object interacts with a given solid aggregate material container, the material level in that container may go down or may otherwise change as material is removed from the container. In order to maintain a proper vertical level of the solid aggregate material, the entire container may be raised. Alternatively, more solid aggregate material may be periodically added to the container. In another embodiment, the solid aggregate material may be pushed up from the bottom of the container. Other embodiments are possible.

Similarly, it may be desirable to monitor the surface height/position of the solid aggregate material in the containers. In an embodiment, a laser rangefinder system may be included to map the top surface of the material. In another embodiment, another type of optical or mechanical means may be used to determine the height of the top surface of the materials. In response to determining the top surface of the material is not ideal (e.g. too low, too bumpy, etc.), the system may adjust the material surface appropriately. For example, in response to a "low" surface height measurement, the system may be configured to push the solid aggregate material up to proper level height. Other ways to monitor and modify the material surface height and texture are contemplated herein.

Method 300 may yet further include at least two containers. The two containers may include solid aggregate materials with different durometers. In such a scenario, the control system may be further configured to, in response to receiving a material property preference, select a solid aggregate material for incorporation into the three-dimensional structure based on the material property preference. For example, as described above, the control system may select stiff materials, such as fiberglass, to satisfy a "stiff" material property preference. Alternatively, the control system may select flexible materials, such as rubber dust, to satisfy a "flexible" material preference.

Figure 4:
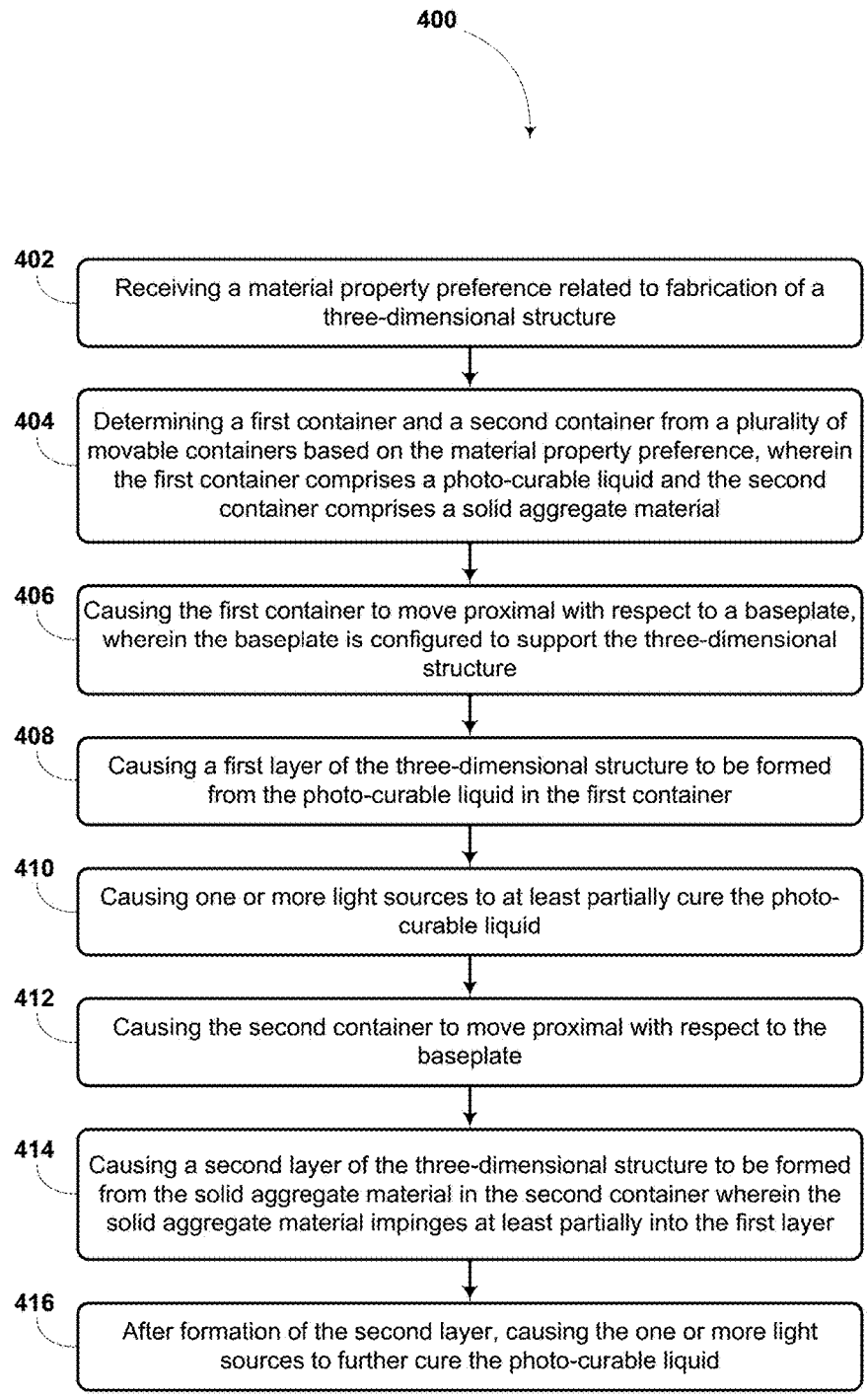
FIG. 4 is a flow chart illustrating a three-dimensional printing method, according to an example embodiment.

FIG. 4 is a flow chart illustrating a 3D printing method 400, according to an example embodiment. The method 400 includes blocks that may be carried out in any order. Furthermore, various blocks may be added to or subtracted from method 400 within the intended scope of this disclosure. The method 400 may correspond to steps that may be carried out using system 100, system 200, or another system illustrated and described in reference to FIGS. 1A-G and FIG. 2.

Block 402 includes receiving a material property preference related to fabrication of a three-dimensional structure. The material property preference may involve the control system receiving a variable associated with a material property. The control system may additionally or alternatively receive a file that describes an object for purposes of 3D printing, such as a Standard Tessellation Language (STL) file, an Object (OBJ) file, or a Polygon (PLY) file, among other possibilities.

The material property preference may include a durometer preference. Alternatively, the material property preference may include an opacity preference, a conductivity preference, a magnetism preference, or another type of preference. As described above, the control system may be configured to determine which solid aggregate materials may be suitable for incorporation into the resin matrix based on the material property preference.

Block 404 includes determining a first container and a second container from a plurality of movable containers based on the material property preference. The first container includes a photo-curable liquid and the second container includes a solid aggregate material. In such a scenario, the control system may update or adjust the 3D object file based on the material property preference. For example, the control system may determine one or more solid aggregate materials (and their associated containers) to form at least part of the 3D object based on the material property preference.

Block 406 includes causing the first container to move proximal with respect to a base plate. The baseplate is configured to support the three-dimensional structure. As described in reference to FIGS. 1A-1G, the first container and the second container may be arranged in a single, partitioned vat. Alternatively, the first container and the second container may include separate vats arranged on a linear track or on a rotary platform. In each case, the control system may be configured to move either or both of the first container and the base plate in order to contact the photo-curable liquid resin.

Block 408 includes causing a first layer of the three-dimensional structure to be formed from the photo-curable liquid in the first container. For example, the base plate may be maintained at a particular vertical position within the resin container, as described in reference to FIG. 1B.

Block 410 includes causing one or more light sources to at least partially cure the photo-curable liquid. The control system may cause the light source(s) to illuminate the first layer so as to at least partially cure the photo-curable resin.

Block 412 includes causing the second container to move proximal with respect to the baseplate. The control system may be configured to cause the second container to move and/or the robotic arm such that the first layer comes into contact with the solid aggregate material.

Block 414 includes causing a second layer of the three-dimensional structure to be formed from the solid aggregate material in the second container. The solid aggregate material may impinge at least partially into the first layer.

Block 416 includes after formation of the second layer, causing the one or more light sources to further cure the photo-curable liquid.

In some embodiments, the photo-curable liquid may include a photo-curable dye, an electrode paste, and a photo-curable resin. In other embodiments, at least one of the containers may include an electrode paste. Such embodiments may be useful in the formation of 3D printed batteries, for instance.

In an example embodiment, the 3D printer system may receive a material property preference relating to the stiffness property of a 3D object. In such an example, the control system may determine that fiberglass is the solid aggregate material to use. Accordingly, the control system may be configured to form a layer-by-layer 3D object incorporating fiberglass. Furthermore, the control system may be configured to control the orientation of the materials incorporated into the 3D object. For example, two containers may include two substantially perpendicular orientations of fiberglass. In other words, the fiberglass may be crosshatched to increase the strength of the object. The control system may be configured to alternate between the two containers while incorporating solid aggregate materials into the resin matrix. In another embodiment, the robotic arm may be configured to rotate the base plate to alternate the orientation of the fiberglass threads. Alternatively, a single container of fiberglass with a particular orientation may be rotated between layers in order to alternate the orientation of the threads. The alternating orientation of the fiberglass may increase the stiffness of the 3D object. Other ways of controlling the orientation, spacing, or other arrangement of the solid aggregate materials are contemplated herein.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A computer-implemented method comprising:
receiving data identifying a solid aggregate material that is to be placed by a 3D printer between first and second layers of a 3D printed object;
selecting a solid aggregate material container that contains the identified, solid aggregate material;
after the first layer of the 3D printed object has been formed by the 3D printer and has partially cured, and before the second layer of the 3D printed object has been formed by the 3D printer, instructing a mechanism of the 3D printer to dip the partially cured first layer of the 3D printed object into the solid aggregate material that is contained in the selected, solid aggregate material container; and
after instructing the mechanism of the 3D printer to dip the one or more surfaces of the partially cured first layer of the 3D object into the solid aggregate material that is contained in the selected, solid aggregate material container, and after the first layer has further cured, forming the second layer over at least a portion of the first layer where the solid aggregate material at least partially impinges on the first layer.

2. The method of claim 1, wherein the mechanism comprises an articulated robot arm.

3. The method of claim 1, comprising:
after the second layer of the 3D printed object has been formed by the 3D printer and has partially cured, and before a third layer of the 3D printed object has been formed by the 3D printer, instructing the mechanism of the 3D printer to dip the partially cured second layer of the 3D printed object into the solid aggregate material that is contained in the selected, solid aggregate material container.

4. The method of claim 1, wherein the solid aggregate material has a diameter between 100 microns and 1 millimeter.

5. The method of claim 1, wherein the second layer is wedge-shaped.

6. The method of claim 1, comprising:
after the partially cured first layer of the 3D printed object has been dipped into the solid aggregate material that is contained in the selected, solid aggregate material container, causing the partially cured first layer to become fully cured.

7. The method of claim 1, wherein the solid aggregate material comprises a radio frequency identification (RFID) device or an electrode paste.

8. The method of claim 1, wherein instructing the mechanism of the 3D printer to dip the partially cured first layer of the 3D printed object into the solid aggregate material that is contained in the selected, solid aggregate material container comprises:
instructing a mechanism of the 3D printer to dip the partially cured first layer of the 3D printed object into the solid aggregate material that is contained in the selected, solid aggregate material container so as to impinge the solid aggregate material through one or more surfaces of the partially cured first layer.

9. A system comprising:
one or more computers and one or more storage devices storing instructions that are operable, when executed by the one or more computers, to cause the one or more computers to perform operations comprising:
receiving data identifying a solid aggregate material that is to be placed by a 3D printer between first and second layers of a 3D printed object;
selecting a solid aggregate material container that contains the identified, solid aggregate material;
after the first layer of the 3D printed object has been formed by the 3D printer and has partially cured, and before the second layer of the 3D printed object has been formed by the 3D printer, instructing a mechanism of the 3D printer to dip the partially cured first layer of the 3D printed object into the solid aggregate material that is contained in the selected, solid aggregate material container; and
after instructing the mechanism of the 3D printer to dip the one or more surfaces of the partially cured first layer of the 3D object into the solid aggregate material that is contained in the selected, solid aggregate material container, and after the first layer has further cured, forming the second layer over at least a portion of the first layer where the solid aggregate material at least partially impinges on the first layer.

10. The system of claim 9, wherein the mechanism comprises an articulated robot arm.

11. The system of claim 9, wherein the operations comprise:
after the second layer of the 3D printed object has been formed by the 3D printer and has partially cured, and before a third layer of the 3D printed object has been formed by the 3D printer, instructing the mechanism of the 3D printer to dip the partially cured second layer of the 3D printed object into the solid aggregate material that is contained in the selected, solid aggregate material container.

12. The system of claim 9, wherein the solid aggregate material has a diameter between 100 microns and 1 millimeter.

13. The system of claim 9, wherein the second layer is wedge-shaped.

14. The system of claim 9, wherein the operations comprise:
after the partially cured first layer of the 3D printed object has been dipped into the solid aggregate material that is contained in the selected, solid aggregate material container, causing the partially cured first layer to become fully cured.

15. The system of claim 9, wherein the solid aggregate material comprises a radio frequency identification (RFID) device or an electrode paste.

16. The system of claim 9, wherein instructing the mechanism of the 3D printer to dip the partially cured first layer of the 3D printed object into the solid aggregate material that is contained in the selected, solid aggregate material container comprises:
    instructing a mechanism of the 3D printer to dip the partially cured first layer of the 3D printed object into the solid aggregate material that is contained in the selected, solid aggregate material container so as to impinge the solid aggregate material through one or more surfaces of the partially cured first layer.

17. A non-transitory computer readable storage medium encoded with a computer program, the program comprising instructions that when executed by data processing apparatus cause the data processing apparatus to perform operations comprising:
    receiving data identifying a solid aggregate material that is to be placed by a 3D printer between first and second layers of a 3D printed object;
    selecting a solid aggregate material container that contains the identified, solid aggregate material;
    after the first layer of the 3D printed object has been formed by the 3D printer and has partially cured, and before the second layer of the 3D printed object has been formed by the 3D printer, instructing a mechanism of the 3D printer to dip the partially cured first layer of the 3D printed object into the solid aggregate material that is contained in the selected, solid aggregate material container; and
    after instructing the mechanism of the 3D printer to dip the one or more surfaces of the partially cured first layer of the 3D object into the solid aggregate material that is contained in the selected, solid aggregate material container, and after the first layer has further cured, forming the second layer over at least a portion of the first layer where the solid aggregate material at least partially impinges on the first layer.

18. The medium of claim 17, wherein the operations comprise:
    after the second layer of the 3D printed object has been formed by the 3D printer and has partially cured, and before a third layer of the 3D printed object has been formed by the 3D printer, instructing the mechanism of the 3D printer to dip the partially cured second layer of the 3D printed object into the solid aggregate material that is contained in the selected, solid aggregate material container.

19. The medium of claim 17, wherein the second layer is wedge-shaped.

20. The medium of claim 17, wherein the operations comprise:
    after the partially cured first layer of the 3D printed object has been dipped into the solid aggregate material that is contained in the selected, solid aggregate material container, causing the partially cured first layer to become fully cured.

* * * * *